United States Patent [19]

Credé

[11] 4,192,146
[45] Mar. 11, 1980

[54] PROCESS FOR THE RECOVERY OF ENERGY AND IN PARTICULAR FOR THE RECOVERY OF HEAT ON THE HEAT PUMP PRINCIPLE

[76] Inventor: Helfried Credé, Fuchsbichl 9b, D-8021 Icking, Fed. Rep. of Germany

[21] Appl. No.: 820,435

[22] Filed: Aug. 1, 1977

[30] Foreign Application Priority Data

Jul. 30, 1976 [DE] Fed. Rep. of Germany ....... 2634233
Apr. 4, 1977 [DE] Fed. Rep. of Germany ....... 2715075

[51] Int. Cl.² .................... F25B 27/00; F25D 3/00; F24H 7/00
[52] U.S. Cl. ............................................. 62/2; 62/59; 62/238; 126/400
[58] Field of Search ................... 237/1 A, 2 B; 62/2, 62/238, 59, 238 W, 324 D; 126/400

[56] References Cited

U.S. PATENT DOCUMENTS

| | | | |
|---|---|---|---|
| 1,969,187 | 8/1934 | Schutt | 62/59 X |
| 1,985,632 | 12/1934 | Fleischer | 62/59 |
| 3,563,304 | 2/1971 | McGrath | 237/2 B |
| 3,952,519 | 4/1976 | Watson | 126/400 X |
| 3,984,050 | 10/1976 | Gustafsson | 237/2 B |
| 3,986,344 | 10/1976 | Newman | 62/238 |
| 3,991,938 | 11/1976 | Ramey | 62/238 |
| 4,019,338 | 4/1977 | Poteet | 62/238 E |
| 4,019,679 | 4/1977 | Vogt et al. | 237/2 B |
| 4,030,312 | 6/1977 | Wallin | 62/2 |
| 4,037,650 | 7/1977 | Randall | 62/238 |
| 4,044,949 | 8/1977 | Morawetz et al. | 237/1 A |
| 4,049,045 | 9/1977 | Moog | 237/2 B |
| 4,123,002 | 10/1978 | Saunders | 237/1 A |

FOREIGN PATENT DOCUMENTS

| | | | |
|---|---|---|---|
| 2160785 | 6/1973 | Fed. Rep. of Germany | 62/238 |
| 2260462 | 6/1974 | Fed. Rep. of Germany | 237/26 |
| 2447505 | 6/1975 | Fed. Rep. of Germany | 62/238 |
| 2411308 | 9/1975 | Fed. Rep. of Germany | 237/1 A |
| 2441775 | 3/1976 | Fed. Rep. of Germany | 126/400 |
| 2552459 | 6/1976 | Fed. Rep. of Germany | |
| 825313 | 3/1938 | France | 62/119 |
| 2290639 | 11/1974 | France | 62/238 |
| 2307235 | 11/1976 | France | 62/238 |
| 231449 | 7/1944 | Switzerland | |
| 237313 | 8/1945 | Switzerland | |

OTHER PUBLICATIONS

Solar Energy: Part II, The Continent p. 87, Heating-/Piping/Air Conditioning.
"Ice-Maker Heat Pump: A New Tool for Energy Conservation", Jan. 1977, vol. 45, #1, Refrigeration Service & Contracting.
"Heat Pump Progress in Europe", The Heating & Ventilating Engineer, Jul./Aug. 1978, A. A. Field.

*Primary Examiner*—Leslie Braun
*Attorney, Agent, or Firm*—Karl H. Gross

[57] ABSTRACT

A body of still water is confined in heat exchange with one or more ambient heat sources whose temperature is usually above but may drop near 0° C. Heat is withdrawn from the body according to the heat-pump principle. If the temperature of the heat sources drops near zero the withdrawal of heat from the body results in the formation of ice in the body and the latent heat of fusion liberated during the ice formation is also withdrawn, so that the time periods during which the temperature of the ambient sources is near 0° C. can be bridged. When the temperature of the ambient sources rises again their heat is used to re-melt the ice in the body of water.

11 Claims, 1 Drawing Figure

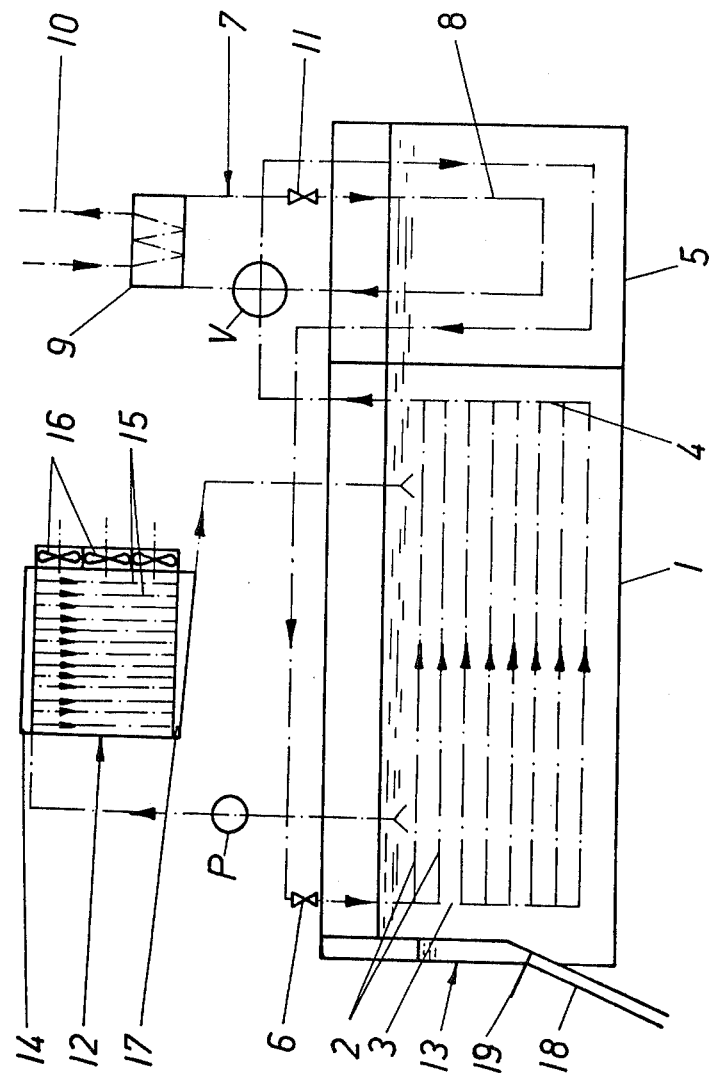

PROCESS FOR THE RECOVERY OF ENERGY AND IN PARTICULAR FOR THE RECOVERY OF HEAT ON THE HEAT PUMP PRINCIPLE

For obtaining heat from ambient sources of heat, such as air and soil, water and also direct solar radiation, there is available a circulation process known as "heat pump". In this, a cold medium, which is brought to a low temperature by adiabatic evaporation, is brought into heat exchange relationship with the ambient heat source. The heated cold medium is heated to a high temperature by compression, whereupon it gives up heat to a heating circuit in a heat exchanger.

Air and soil are poor conductors of heat, for which reason and owing to the danger of icing up of the heat transfer surfaces they have hitherto received little attention for the purpose of obtaining heat. Water, which basically would be well suited for obtaining heat for heating purposes, is available in sufficient quantities only in exceptional cases as soil water or surface water. In winter, which is the season of greatest heating solar radiation is so slight owing to the low position of the sun and frequent occurrence of cloud, that it cannot be resorted to to cater for more than a basic need for heating.

In order, in the use of water as a source of heat, to reduce the necessary quantity of water in such manner that e.g. drawing from the public water supply is possible, in accordance with a proposal in Swiss Pat. No. 231 449 the latent heat of the water is rendered useful for heating purposes by cooling the drawn water to the freezing point and freezing it. The ice that becomes deposited on the vaporiser of the "heat pump" is periodically broken off by changing the shape of the parts on which the ice is deposited or, in accordance with a proposal in Swiss Pat. No. 237 313 is loosened by melting the adhering layer from within. The broken off or loosened ice is then to be swept off into a duct system or into a sea or river which is available. Owing to the large quantity of ice forming—about 3 tons a day for an average one-family house—and the associated technical and ecological problems the path of the ice deposit into the duct system or sea or river is not accessible.

In the first-mentioned Swiss Pat. No. 231 449 the use of a cooling system for an artificial ice path for heating purposes is also mentioned. The cooling system has to dissipate the heat flowing from the ambient air into the artificial ice path; the heat can be fed into a heating circuit. Apart from the fact that in relation to the size of the cooling system the recovery of heat is only slight owing to the poor flow of heat, which it is not desired to improve, from the ambient air over the ice into the cooling medium, the heat incidence is the reverse of what is required. With a high external temperature the cooling system operates fully with a corresponding incidence of heat, in order to keep the ice frozen. The lower the external temperature falls, the less does the cooling system need to operate, at external temperatures below 0° C. may even come to a standstill. Just when heating is most required the cooling system fails in the recovery of heat.

The invention is based on the problem of providing a process in which generally available ambient heat sources can be used for the economic recovery of energy and in particular for the recovery of heat for heating purposes and periods of frost can be bridged.

In accordance with the invention this problem is solved by the process as disclosed herein.

Ambient heat sources, that are generally available, are e.g. the ambient air, soil, rain water, melted snow water, domestic waste water, solar radiation. The starting point of the process according to the invention is the fact that even in our latitudes in winter the ambient temperature, apart from a few periods of frost, is generally above 0° C. and frequently well above this.

For the recovery of heat from ambient heat sources the process according to the invention provides between the ambient sources and the circulation path for the cooling medium of the "heat pump" a water reservoir which on the one hand is in heat exchange relationship with the cooling medium of the heat pump, in order to draw heat from the water into the cooling medium, taking into account the formation of ice, and to which on the other hand heat is fed from the ambient heat sources to melt ice that has formed.

For melting the ice that forms in the process according to the invention one or more of the said ambient heat sources are always available. Periods of frost can be bridged by providing a large water reservoir of e.g. 20–50 m$^3$ as a heat store or buffer. Then during periods of frost ice is produced which is remelted later when the frost periods are over by means of the said ambient heat sources. If the period of frost lasts for a long time the relatively cheap off-peak current can be utilized for melting the ice.

The heat store or buffer, owing to its low temperature, viz. 0° C., does not undergo any loss of energy by heat radiation, conduction or convection, in contrast when embedded in "warm" soil affords a recovery of energy.

In addition to its function as a heat store or buffer the water reservoir fulfils a further important function. Whilst with direct heat exchange of the ambient air with the cooling medium of the heat pump rapid icing of the vaporiser and hence a complete cessation of the flow of heat from the air into the cooling medium is to be expected, in the case of the present process the ambient air is brought into heat exchange relationship with the water reservoir, which is at a temperature of 0° C., so that the moisture in the air is not deposited as ice. On the contrary, ice is formed on the vaporiser surfaces immersed in water, where it can be satisfactorily be remelted by the water that passes over it and which has been heated by the ambient heat sources.

According to the external temperature and the heating requirements a more or less thick coating of ice will form around the surfaces of the vaporiser, which will impair the flow of heat from the water reservoir to the cooling medium. In order to take account of this, the surfaces of the vaporiser should be made sufficiently large. Advantageously the deposited ice is also continuously or periodically loosened from the vaporiser surfaces, for which purpose mechanical or thermal loosening processes in accordance with Swiss Pat. Nos. 231 449, 237 313 and German Offenlegungsschrift 25 52 459 are available.

Advantageously the water reservoir may have a substance, e.g. cooking salt, added to it so that a porous ice layer of improved heat conductivity forms which can more easily be loosened, e.g. mechanically. The porosity of the ice layer is attributable to a multiplicity of capillaries in which the salt separates during the formation of ice in the form of highly concentrated sols.

As the ambient heat source for the supply of heat to the water reservoir the external air comes into consideration in the first place. Water from the water reservoir is advantageously fed in a closed circuit through a heat exchanger, where it is brought into intensive heat exchange relationship with the ambient air. A part of the moisture in the air will condense, so that heat of condensation given off can additionally be used. For the utilization of solar radiation, water can be fed from the reservoir tank through solar collectors of known construction. Soil heat can be used, the tank for the water reservoir being embedded in the soil. Rain water and melted snow water can be introduced directly into the water reservoir, in which case an overflow should be provided, e.g. into the public system. Domestic waste water, which has an average temperature of about 30° C., must be brought into contact with the water reservoir via a heat exchanger in view of the dirt that it contains.

As above described, the heated cooling medium is, in the process known as "heat pump", heated to a high temperature by compression, whereupon it gives up its heat in a heat exchanger to a heating circuit. Since the work to be expended in the compressor rises more than proportionally to the temperature difference to be overcome, it is desirable to perform the compression in two stages, the first stage during night time in order to use the cheaper off-peak current and the second stage during the day time when heat is required for heating. For performing the two-stage process the water reservoir is divided into a large primary water reservoir and a smaller secondary water reservoir. During the night the secondary water reservoir is heated to an intermediate temperature e.g. 40° C. by withdrawal of heat from the primary water reservoir, and during the daytime the heat required for heating the house is fed into a heating circuit, making use of the same compressor. The two-stage compression is not only economical in current; it also permits higher hot water temperatures to be achieved. Since in the summer months, when no heating is required but only hot water, owing to the higher external temperatures the water reservoir also attains a relatively high temperature and there is a thermal gradient to the now relatively colder soil, hence heat would flow away unused, advantageously in these summer months only the secondary water reservoir, which is thermally insulated from the soil, is used.

The process according to the invention will be explained in more detail with reference to the accompanying drawing, which is a diagrammatic illustration of the circuit of the cooling medium and the tubing of the water reservoir.

A concrete primary container 1 of e.g. 5×5 m floor area ×2.5 m height and of about 50 m³ water capacity, constructed in the soil, is traversed by substantially parallel vaporiser tubes 2 which are filled and emptied via collecting ducts 3, 4. The mutual spacing of the vaporiser tubes is such that the maximum possible ice coating around a vaporiser tube prior to merging with the ice coating of the adjacent vaporiser tube still permits an acceptable flow of heat from the water reservoir to the cooling medium. The outermost vaporiser tubes have to be arranged at a sufficiently long distance from the walls of the container such that the ice coating does not extend to them. The means for anchoring the vaporiser tubes must withstand the forces exterted by the ice.

The cooling medium flowing through the vaporiser tubes 2 and heated by the water in the primary container 1 is heated by a compressor V in a first stage and is brought into heat exchange relationship through a secondary container 5 of about 8 m³ water capacity in order to heat this water to about 40° C. during the night time when the compressor V operates with cheap off-peak current. The cooling medium that condenses is returned to the tubes 2 via a throttle 6.

A second cooling medium circuit 7 having a vaporiser 8 immersed in the secondary container 5 extends via the same compressor V into a condenser 9 from which heat at a higher temperature is led away into a heating circuit 10. From the condenser 9 the cooling medium is returned to the vaporiser 8 via a throttle member 11.

The supply of heat to the primary container 1 takes place, in the case illustrated (a) via the soil and the container walls,
(b) via a heat exchanger 12 exposed to the external air and
(c) via a domestic waste water collector 13 immersed in the primary container.

Cold water from the primary container 1 is pumped by a pump P into a reservoir 14 of the heat exchanger 12. From here the water flows under gravity into a battery of parallel substantially vertical copper tubes 15, which if need be may be passed over by the external air with the aid of a blower 16. The heated water is collected in a lower collecting tube 17 and fed back to the primary container.

The domestic waste water collector 13 of about 1 m³ capacity is connected to the duct system by a down pipe 18. A slide valve 19 holds the down pipe normally closed and opens e.g. by a time-limit switch, when the domestic waste waters have emitted substantially their heat content into the primary water reservoir.

I claim:
1. A process for the recovery of thermal energy from generally available ambient sources of thermal energy, particularly from ambient air, whose temperature is above but may drop near 0° Centigrade, comprising the steps of exposing a confined body pf still water to heat exchange with at least one such source of thermal energy to transfer heat energy into the body of water and raise the temperature of the same; circulating a refrigerating medium through the body of water to withdraw heat energy from the same according to the heat-pump principle with the formation of ice therein when the temperature of said one source drops near 0° C.; continuing to effect withdrawal of heat energy from said body of water to withdraw the latent heat of fusion liberated during the formation of ice, so as to bridge those periods of time wherein said one source drops near or below 0° C. and until the temperature of said one source rises again; and thereupon re-melting the thus formed ice by heat exchange with said one ambient source of thermal energy.

2. A process as defined in claim 1, wherein the step of exposing comprises effecting heat exchange between the body of water and at least one ambient source of thermal energy by causing the water to pass through a heat exchanger.

3. A process as defined in claim 1, wherein the step of exposing comprises effecting heat exchange between the body of water and the at least one ambient source of thermal energy by causing the water to pass through a solar collector.

4. A process as defined in claim 1, wherein the step of exposing comprises admitting domestic waste water into heat-exchange relationship with the body of water.

5. A process as defined in claim 4, wherein the step of admitting domestic waste water into heat-exchanging relationship with the body of water comprises confining the waste water in separated but heat-exchanging relationship with said body of water until it has yielded up at least a substantial part of its thermal energy to the same, and thereafter discharging the collected waste water.

6. A process as defined in claim 1, and further comprising the auxiliary step of only at times effecting heat exchange between the body of water and a source of artificially generated heat.

7. A process as defined in claim 1, wherein the refrigerating medium is circulated through the body of water in at least one conduit having a wall on which the ice forms; and further comprising the step of dislodging the ice from said wall.

8. A process as defined in claim 1; and further comprising the step of adding to the body of water a substance which causes the forming ice to be porous so as to reduce its mechanical strength and improve its thermal transmissivity.

9. A process as defined in claim 1; further comprising the steps of circulating a refrigerating medium through the body of water to withdraw heat energy into an additional confined body of water during a first period of time according to the heat pump principle; and circulating another refrigerating medium through said additional body during a different second period of time so as to withdraw heat from said additional body according to the heat pump principle.

10. A process as defined in claim 9; wherein the step of circulating said first refrigerating medium comprises the step of compressing said refrigerating medium in a compressor during a first time period, and the step of circulating said other refrigerating medium comprises the step of compressing said other refrigerating medium in the same compressor during a different second time period.

11. A process as defined in claim 1, wherein said body of water is confined in a reservoir sufficiently large for the body to act as a heat store in the event no thermal energy is available during a prolonged period of time from an ambient source.

* * * * *